Patented Mar. 26, 1929.

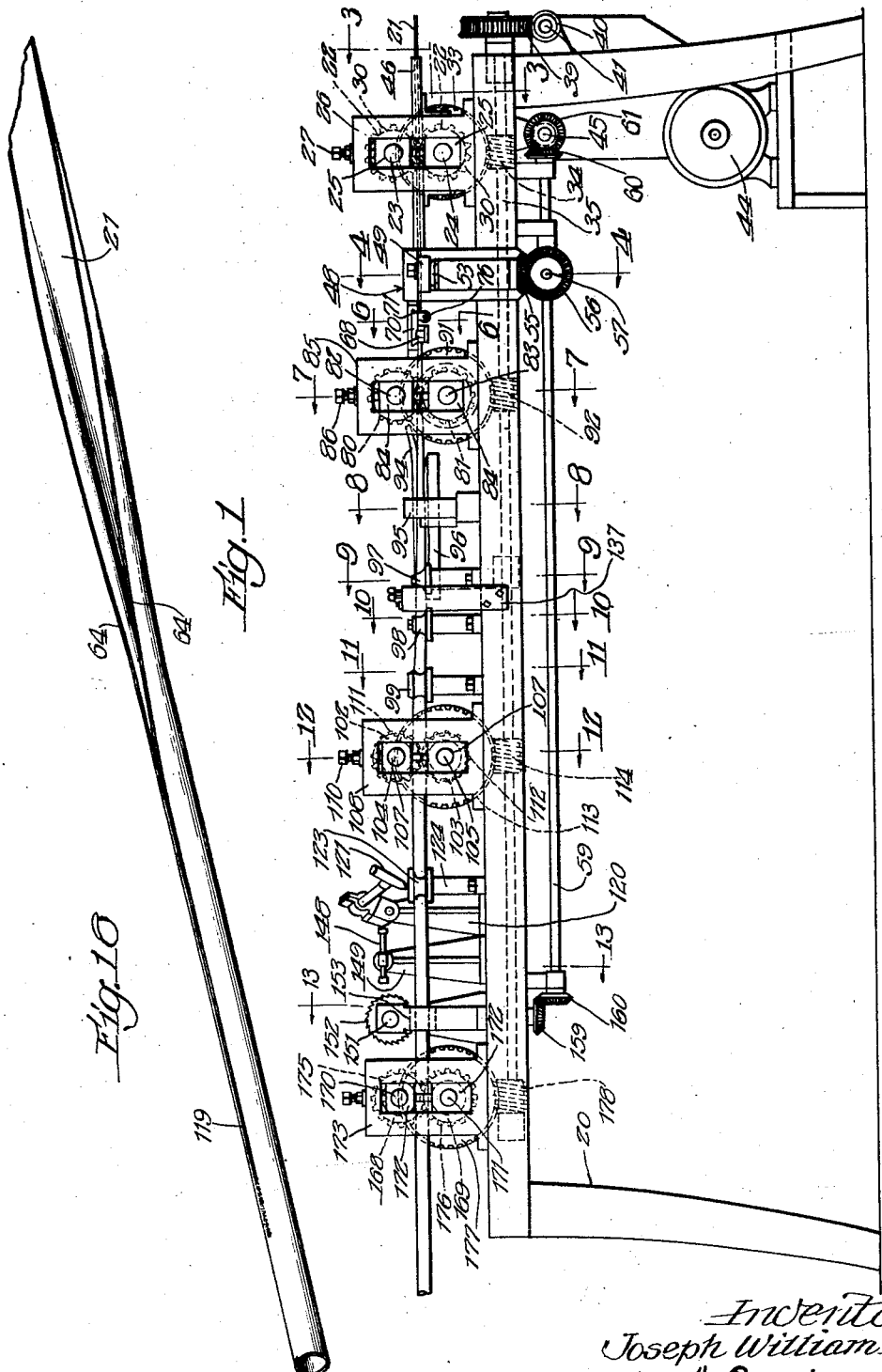

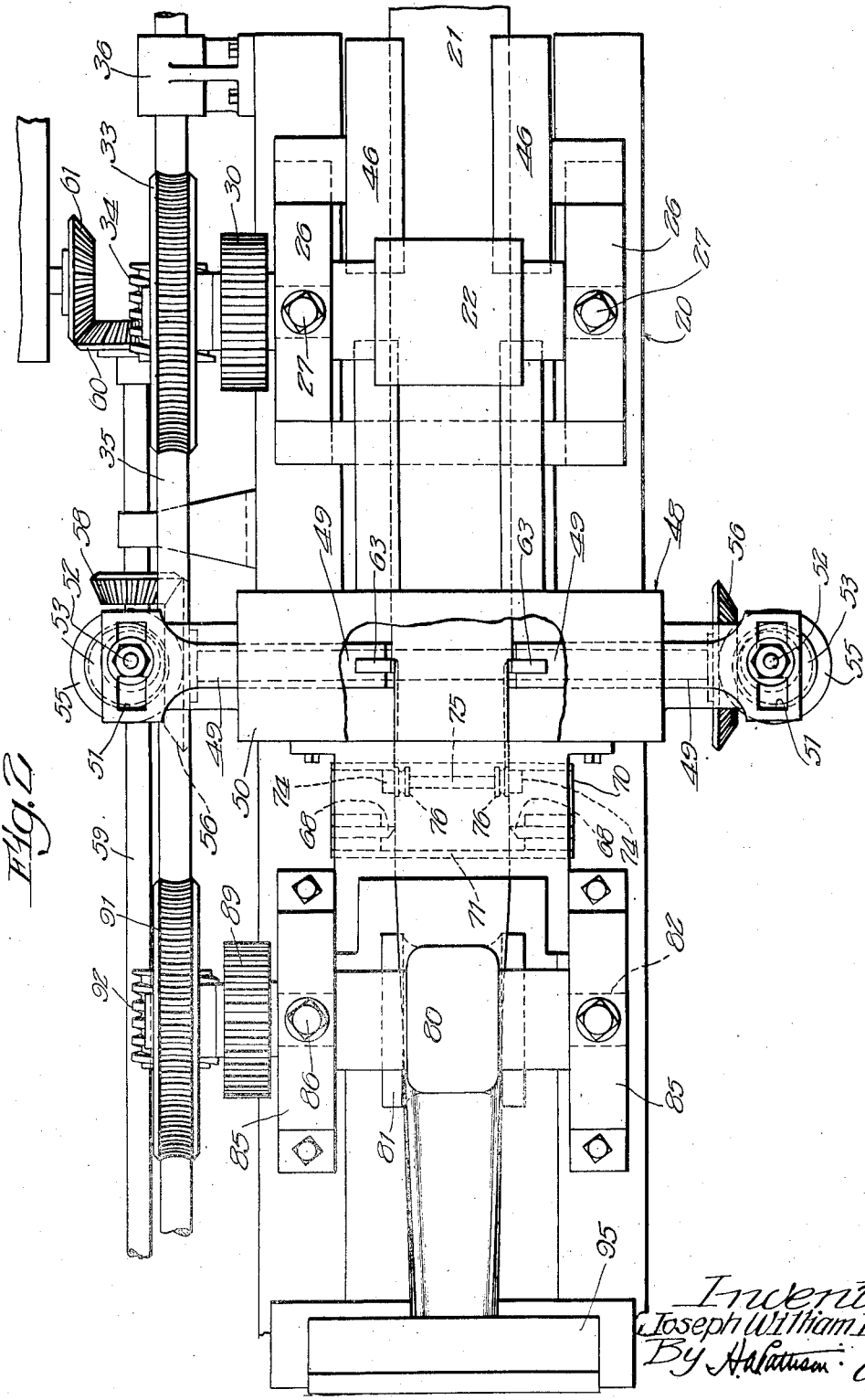

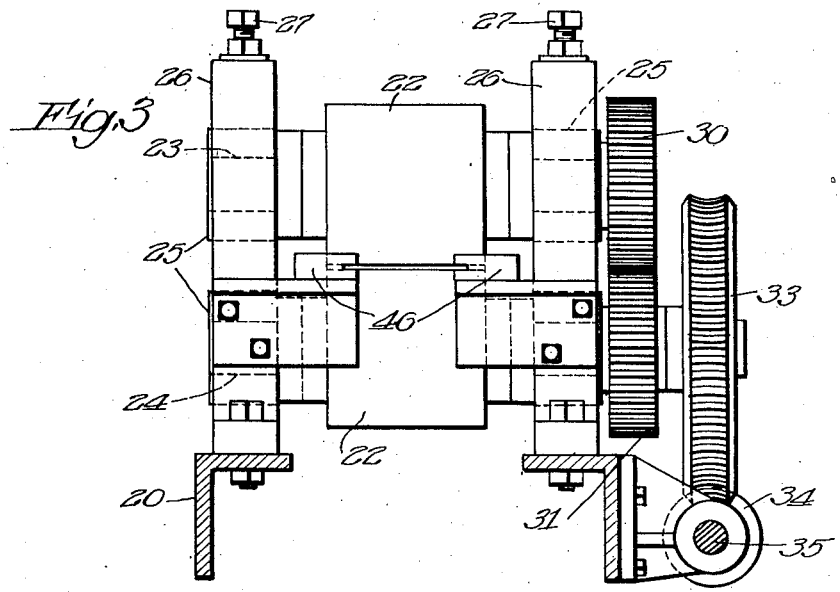

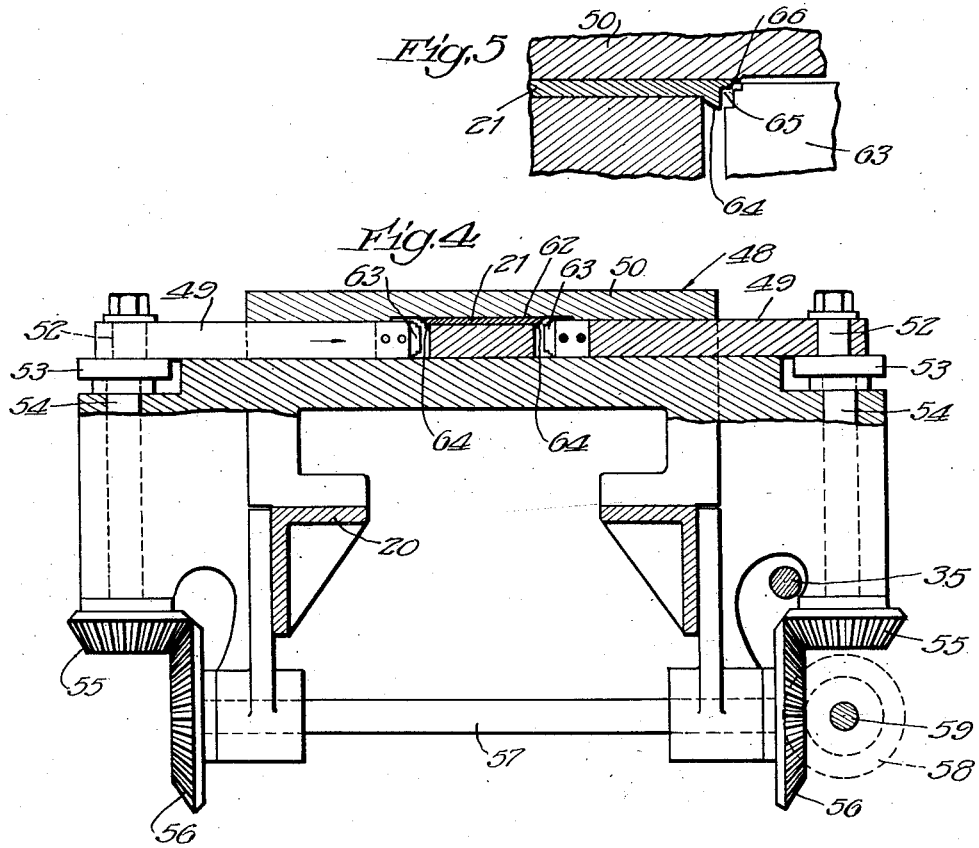
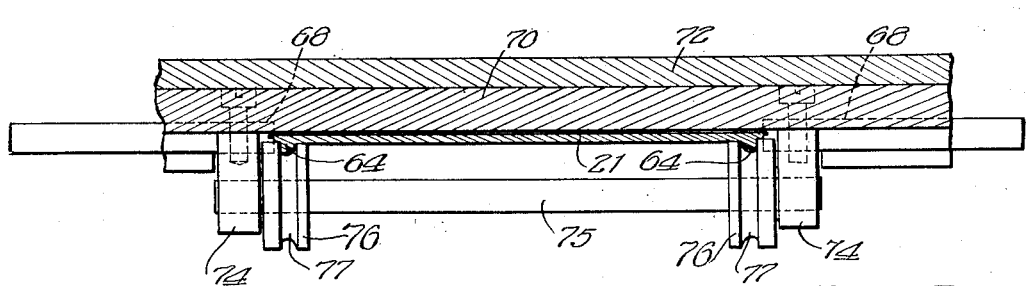

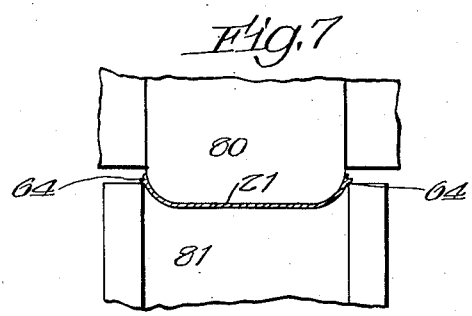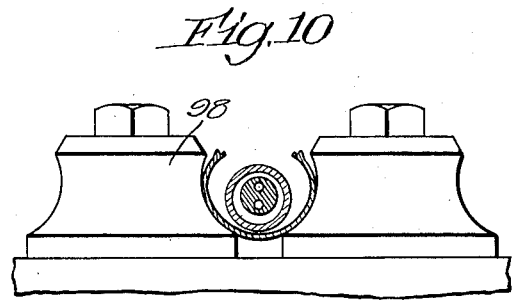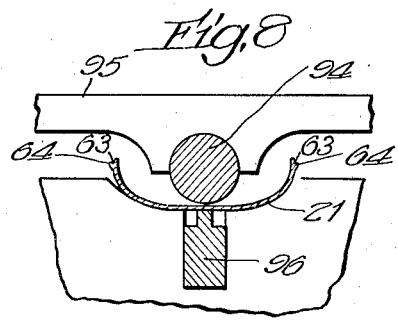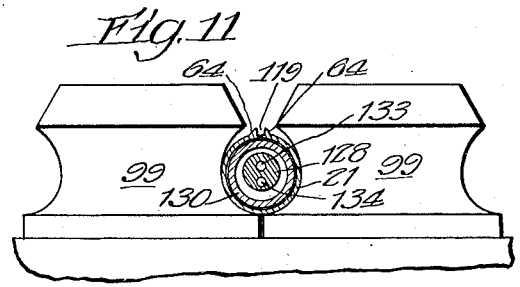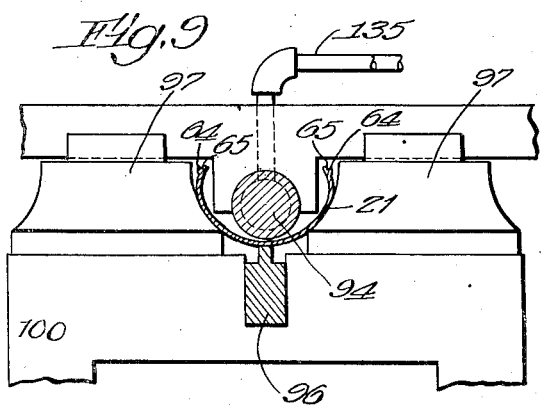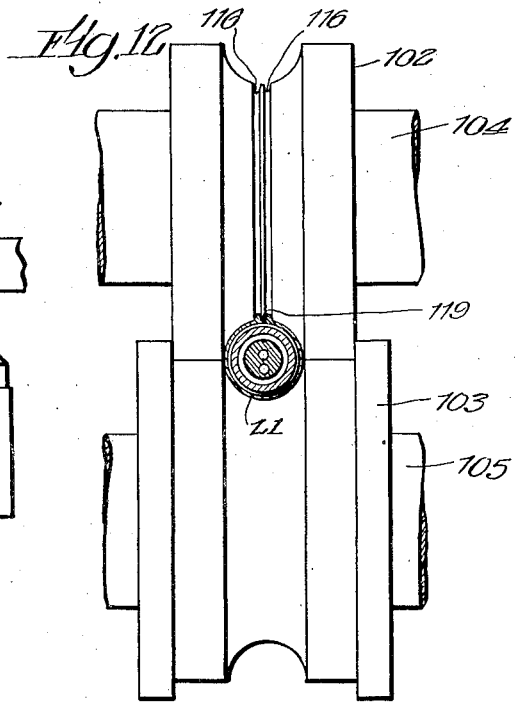

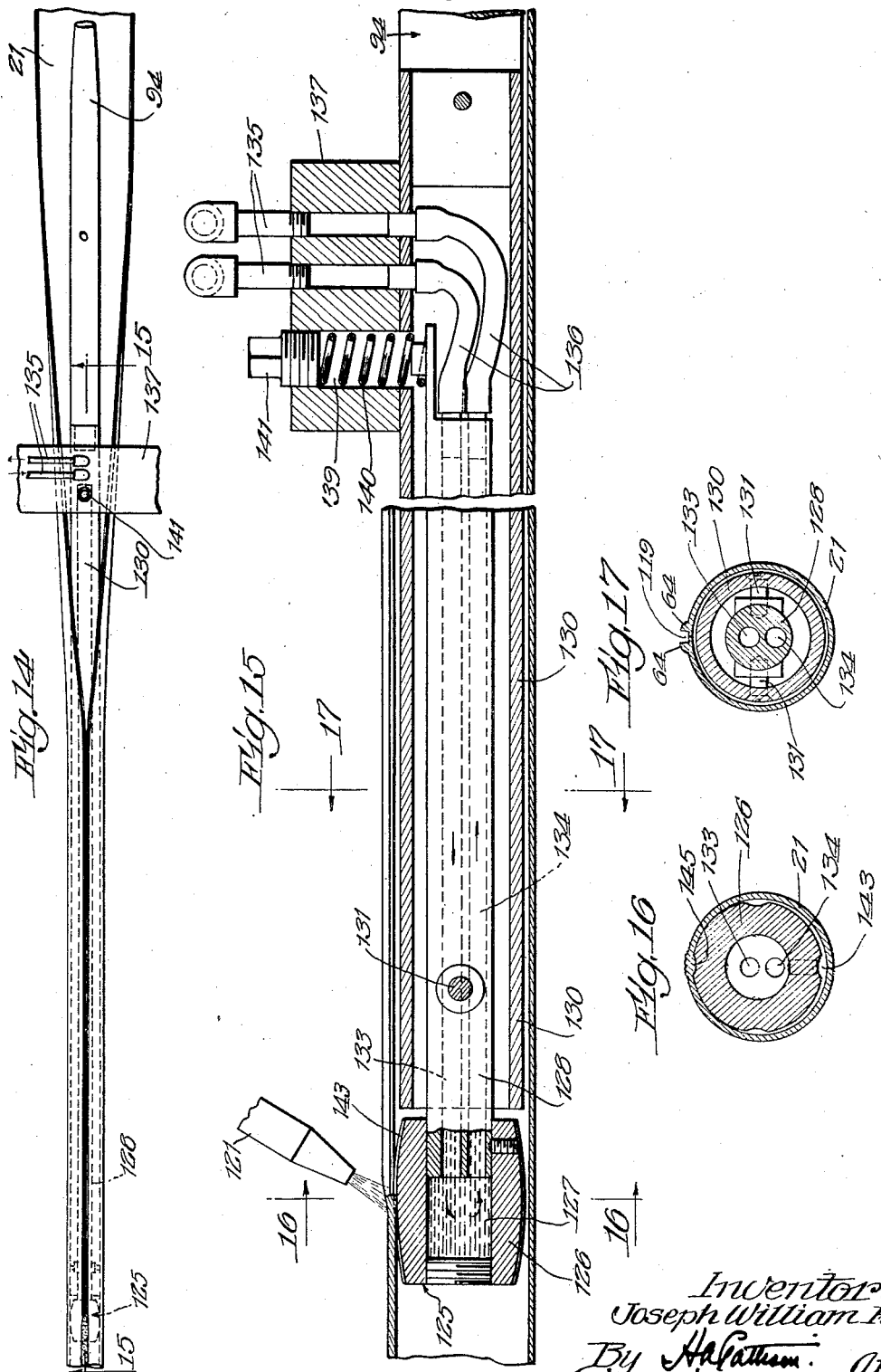

1,706,393

UNITED STATES PATENT OFFICE.

JOSEPH WILLIAM FAY, OF VILLA PARK, ILLINOIS, ASSIGNOR TO WESTERN ELECTRIC COMPANY, INCORPORATED, OF NEW YORK, N. Y., A CORPORATION OF NEW YORK.

APPARATUS FOR FORMING ARTICLES.

Application filed September 24, 1924. Serial No. 739,449.

This invention relates to apparatus for forming articles and more particularly to apparatus for forming articles having welded portions.

The primary object of the invention is to provide apparatus for forming articles of the character described whereby the articles can be produced at a minimum cost and wherein the welded portions will have as much tensile strength per unit of cross sectional area as the other portions thereof and will not be reduced in thickness.

A further object of the invention is to provide an improved apparatus for preparing material for a welding operation.

A still further object of the invention is to provide an improved apparatus for forming tubing and the like from flat stock.

In one form of the invention the improved apparatus is adapted to withdraw a flat strip of stock from a supply thereof and to form the stock into a cylindrical tube, two edge surfaces of the stock being welded to each other. As the method is preferably practiced by the use of this improved apparatus, a continuous ridge or tongue is first swaged along each side edge of the stock, but spaced therefrom in such manner that, when the two side edges of the stock are afterwards brought into abutting positions to form the stock into a cylindrical tube a slot is formed between the continuous tongues. The tongues are formed from material obtained from the marginal portions of the stock which is reduced in width by the swaging operation. Any fins formed upon the stock during the swaging operation are removed therefrom by knives mounted in a slide which guides the knives in response to lateral movements of the stock. To form the stock into a cylindrical tube, marginal portions of the stock along the side edges thereof are first curved to radii substantially equalling the radius it is desired to give to the tube. The material intermediate these curved portions is then formed into the desired shape, the curved marginal portions readily assuming their correct positions with respect to each other in the final forming operation. Relative motion is caused between the stock in its tubular form and an oxy-acetylene torch adapted to direct a flame into the slot formed by the continuous tongues. The abutting portions of the stock and the continuous tongues are fused, the material in the tongues being drawn into the slot by the heat of the oxy-acetylene flame. The fused material is then cooled by means of a chill block disposed within the tube and by means of a plurality of jets of cooling fluid which are directed upon the outer surface of the tube. The burr formed upon the outer surface of the tube during the welding operation is removed therefrom and the tube is then advanced through a plurality of rolls adapted to roll the tube to correct size and shape.

Other objects and features of the invention will become apparent as the detailed description progresses, reference being had to the accompanying drawings wherein Fig. 1 is a side elevation of apparatus embodying the invention;

Fig. 2 is a fragmentary plan view of the improved apparatus;

Figs. 3 and 4 are sections taken on lines 3—3 and 4—4, respectively, of Fig. 1;

Fig. 5 is an enlarged fragmentary section taken on the same line as Fig. 4;

Figs. 6 to 13, inclusive, are sections taken on lines 6—6, 7—7, 8—8, 9—9, 10—10, 11—11, 12—12 and 13—13, respectively, of Fig. 1;

Fig. 14 is a plan elevation of certain details of the apparatus shown in connection with a tube partially formed by the apparatus;

Fig. 15 is a section taken on line 15—15 of Fig. 14;

Figs. 16 and 17 are sections taken on lines 16—16 and 17—17 of Fig. 15, and

Fig. 18 is a perspective view of a tube partially formed by the apparatus.

It is believed that a complete understanding of the improved apparatus will be procured from the following detailed description.

Referring for the present to Fig. 1, 20 is a frame upon which the several elements of the improved apparatus are mounted. The apparatus is adapted to form tubing from a continuous strip of stock 21 which is withdrawn from a supply reel or any other suitable device (not shown), by a plurality of feed rolls 22. The feed rolls 22 are secured to shafts 23 and 24 mounted in journals 25 which are in turn slidably mounted in brackets 26 secured to the frame 20. Threaded into the brackets 26 are bolts 27 which may be employed to regulate the pressure with which the feed rolls 22 engage the stock 21. A gear 30 secured to the shaft 23 meshes with a gear 31 secured to the shaft 24. A worm gear 33 also secured to the shaft 24 meshes with a worm 34 keyed to a worm shaft 35 rotatably journaled in bearing brackets 36 secured to the frame 20. A worm gear 39 secured to one end of the shaft 35 meshes with a worm 40 rigidly secured to a shaft 41 journaled in brackets 42 mounted upon the frame 20. The shaft 41 is operatively connected by a suitable gearing, (not shown) to an electric motor 44 which is also operatively connected by suitable gearing (not shown) to a shaft 45.

Associated with the feed rolls 22 are a pair of slotted bars 46 adapted to guide the stock 21 to a swaging mechanism 48 which comprises a pair of bars 49 slidably journaled in a bracket 50 mounted upon the frame 20. The bars 49 are disposed in opposed relation to each other and each bar has a slot 51 formed therein which accommodates an eccentric pin 52 forming part of an eccentric 53 rigidly secured to the upper end of a vertically disposed shaft 54. Secured to the lower end of each shaft 54 is a bevel gear 55 meshing with a bevel gear 56 secured to a rotatably journaled shaft 57. One of the bevel gears 56 meshes with a bevel gear 58 keyed to a shaft 59 which is operatively connected to the shaft 45 by bevel gears 60 and 61. As best shown in Fig. 4, the bracket 50 is provided with a passage 62 through which the stock 21 may be advanced. Each bar 49 is provided with a hammer member 63 adapted to swage a continuous rib or tongue 64 upon the stock. The continuous tongues 64 are formed of metal obtained from the marginal portions of the stock, the stock being reduced in width during the swaging operation. The hammer members 63 swage a plurality of grooves 65 between the edge surfaces of the stock and the bottom surface thereof and the metal so displaced together with the metal displaced when the stock is reduced in width is formed into the tongues 64.

In practice, a thin fin 66 forms upon each of the edge surfaces of the stock 22 during the swaging operation. The apparatus comprises a plurality of knives 68 adapted to remove the fins 66 from the stock immediately after the stock is advanced beyond the swaging mechanism 48. The knives 68 are fixed in a slide 70 journaled in ways 71 formed in a plate 72 mounted on the frame 20. Depending from the slide 70 are a pair of bearing blocks 74 which rotatably journal the ends of a shaft 75. A pair of rollers 76 secured to the shaft 75 are grooved as at 77. The grooves 77 are engaged by the tongues 64 in such manner that lateral displacement of the stock 21 is accompanied by displacement of the slide 70 and the knives 68 in the same direction. This insures that the knives will remove the fins 66 and will not cut into the stock proper.

Crimping rolls 80 and 81 are adapted to receive the stock 21 as it is advanced from the knives 68. The crimping rolls 80 and 81 are rigidly secured to shafts 82 and 83 respectively, each of which shafts is rotatably mounted in journals 84 slidably mounted in brackets 85 mounted upon the frame 20. The pressure with which the crimping rolls 80 and 81 engage the stock 22 is regulated by bolts 86 threaded into the brackets 85. Keyed to the shaft 82 is a gear 89 which meshes with a gear 90 keyed to the shaft 83, the shaft 83 having rigidly secured to it a worm gear 91 which meshes with a worm 92 mounted upon the aforementioned shaft 35.

The crimping rolls 80 and 81 are adapted to curve each of the marginal portions of the stock 21 to a radius which is substantially equal to the radius which it is desired to give to the completed tube, the angle subtended by each arcuate portion being nearly ninety degrees.

Aligned with the crimping rolls 80 and 81 is a mandrel 94 which is supported intermediate its ends upon a bracket 95 which also supports a guide bar 96 disposed beneath the mandrel, (Figs. 1 and 8). The guide bar 96 is adapted to hold the stock 21 in substantial engagement with the mandrel 94 as the stock is advanced to a plurality of forming rolls 97, 98 and 99. The rolls 97, 98 and 99 cooperate with the mandrel 94 to rough the stock into tubular form.

Forming rolls 102 and 103 are adapted to receive the stock 21 as it is advanced from the forming rolls 99. The forming rolls 102 and 103 are rigidly secured to shafts 104 and 105, respectively, the shafts 104 and 105 being rotatably mounted in journals 107 which are slidably mounted in brackets 108 secured to the frame 20. The pressure with which the rolls 102 and 103 engage the stock is regulated by bolts 110 threaded into the brackets 108. A gear 111 keyed to the shaft 104 meshes with a gear 112 secured to the shaft 105. A worm gear 113 keyed to the shaft 105 meshes with a worm 114 secured to the shaft 35. The roll 102 is provided with a plurality of annular grooves 116 which accommodate the tongues 64. The rolls 102 and 103 cooperate with each other to bring the side edges of the stock substantially into contact with each other so that the grooves 65 form a slot 119.

Mounted adjacent the rolls 102 and 103 upon a bracket 120 is an oxy-acetylene torch 121, the flame of which is directed into the slot 119 in such manner that the metal in the tongues 64 and the marginal portions forming the contacting side edges is fused. The fused metal obtained from the tongues 64 more than fills the slot 119 so that a burr is left upon the outer surface of the stock when the metal solidifies and forms a weld between the side edges of the stock. Rolls 123 mounted upon a plurality of brackets 124 prevent the side edges from springing apart during the welding operation.

A chill device 125 which comprises a chill block 126 solidifies the fused metal as it is advanced from beneath the torch 120 (Figs. 14, 15, 16 and 17). The chill block 126 is provided with a chamber 127 and is carried upon one end of a rod 128 which is pivotally mounted intermediate its ends in a tube 130 which constitutes one end of the mandrel 94. Screws 131 are provided for pivoting the rod 128 in the tube 130. Passages 133 and 134 formed in the rod 128 communicate with the chamber 127 and connect it with a suitable supply (not shown) of cooling liquid through the medium of pipes 135 and flexible tubing which is indicated at 136. The pipes 135 are supported in a bracket 137 which also cooperates with the bracket 95 to support the mandrel 94. Disposed in a bore 139 formed in the bracket 137 is a helical compression spring 140. The helical compression spring 140 is interposed between one end of the rod 128 and a plug 141 threaded into the bore 139. The spring 140 tends to rotate the rod 128 in a clockwise direction (Fig. 15) around its transverse axis so as to yieldingly hold the chill block 126 in contact with the inner surface of the stock 21 directly beneath the torch 120. The chill block 126 is preferably provided with longitudinal grooves 143, any one of which may be brought into a position wherein it will receive some of the material fused by the torch to form a continuous bead 145 upon the inner surface of the stock.

A perforated pipe section 148 supported from a bracket 149 is connected to a suitable source (not shown) of cooling liquid and is adapted to direct the cooling fluid upon the solidifying metal as the stock 21 passes from beneath the torch 121.

Rigidly secured to a shaft 151 is a milling cutter 152 having a concave cutting face adapted to remove the burr formed upon the outer surface of the welded joint (Figs. 1 and 13). The shaft 151 is journaled in brackets 153 and 154 and a bevel gear 155 keyed to one of its ends meshes with a bevel gear 156 keyed to the upper end of a vertically disposed shaft 157 journaled in the bracket 154. Keyed to the lower end of the shaft 157 is a bevel gear 159 which meshes with a bevel gear 160 secured to the aforementioned shaft 59. A bushing 166 fixed in the bracket 153 guides the stock 21 to the milling cutter which is provided with a concave cutting face.

Rolls 168 and 169 are adapted to true the tubing to the desired diameter as it leaves the milling cutter 152. The rolls 168 and 169 are secured to shafts 170 and 171 respectively, the shafts 170 and 171 being mounted in journals 172 which are slidably mounted in brackets 173. Keyed to the shaft 170 is a gear 175 which meshes with a gear 176 keyed to the shaft 171. A worm gear 177 also keyed to the shaft 171 meshes with a worm 178 secured to the shaft 35.

In the operation of the apparatus, one end of a piece of a strip of stock 21 is inserted between the feed rollers 22 and the motor 44 is set in operation. The feed rollers 22 advance the stock 21 to the swaging mechanism 48 which forms the continuous tongues 64 upon the stock. The knives 68 then remove the fins 66 from the stock, which stock passes to the crimping rolls 80 and 81. The crimping rolls 80 and 81 curve the marginal portions of the stock in the manner above described and advance the stock to the forming rollers 97, 98, 99, 102 and 103 which bring the side edges of the stock substantially into contact with each other, the forming rollers 102 and 103 advancing the stock to the torch 120 which performs the welding operation. The milling cutter 152 then removes the bur formed upon the stock during the welding operation and the rolls 168 and 169 true it to its proper form and diameter.

What is claimed is:

1. In welding apparatus, a mandrel, means cooperating with the mandrel for forming a tubular article, means for fusing a portion of said article, means pivotally supported by the mandrel for chilling the fused portion, and yielding means engaging the mandrel for holding said last mentioned means in engagement with said portion.

2. In welding apparatus, a mandrel, means cooperating with the mandrel for forming a tubular article, means for fusing a portion of said article, pivotally mounted means for chilling said fused portion, and yielding means for holding said last mentioned means in engagement with said fused portion.

3. In welding apparatus, reciprocatory swaging means for forming a projection on the marginal portion of a piece of stock spaced from a surface thereof to be welded, a roll having an annular groove conforming in contour with and snugly fitting said projection, and means for fusing said stock.

4. In welding apparatus, reciprocatory swaging means for forming a plurality of projections on the marginal portion of a piece of stock, spaced from a surface thereof to be welded, a mandrel, a roll cooperating with the mandrel for forming said stock into a tubular article, said roll having a contour accommodating said projections, and means for fusing said stock.

5. In apparatus for preparing material for a welding operation, reciprocatory swaging means for engaging the material to form a lateral projection on the marginal portion of the material which has a surface to be welded, said projection being spaced from said surface, continuously operable means for intermittently actuating the swaging means, means for causing a relative movement between the material and the swaging means, and a cutting means for engaging the margin of the material to remove fins therefrom developed during the swaging operation.

6. In welding apparatus, means for advancing stock to be welded, reciprocatory swaging means for engaging the stock to form the marginal portion of the advancing stock, a slide freely movable in a direction transverse to the direction in which the stock is advanced and adapted to receive and to be engaged by the stock in such manner that it moves in response to lateral movements of the stock, and cutting means mounted in a fixed position on the slide and adapted to engage the marginal portions of the stock.

In witness whereof, I hereunto subscribe my name this 30 day of August, A. D. 1924.

JOSEPH WILLIAM FAY.